(12) United States Patent
Fujimoto et al.

(10) Patent No.: US 11,156,154 B2
(45) Date of Patent: Oct. 26, 2021

(54) INTERNAL COMBUSTION ENGINE

(71) Applicant: HONDA MOTOR CO., LTD., Tokyo (JP)

(72) Inventors: Yasushi Fujimoto, Wako (JP); Kinya Mizuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 483 days.

(21) Appl. No.: 14/964,003

(22) Filed: Dec. 9, 2015

(65) Prior Publication Data

US 2017/0167550 A1 Jun. 15, 2017

(51) Int. Cl.
*F16D 25/10* (2006.01)
*F16D 48/02* (2006.01)
(Continued)

(52) U.S. Cl.
CPC ............... *F02B 61/02* (2013.01); *F01M 1/02* (2013.01); *F01M 1/10* (2013.01); *F01M 1/16* (2013.01); *F16D 21/06* (2013.01); *F16D 25/0638* (2013.01); *B62M 11/04* (2013.01); *F01M 2001/0269* (2013.01);
(Continued)

(58) Field of Classification Search
CPC ............. F16D 48/02; F16D 2048/0227; F16D 2048/0233; F16D 2048/0236; F16D 2048/0239; F16D 2048/0242; F16D 2048/0281; F16D 2048/023721; F16D 2048/06; F16D 2021/0661; F16D 2021/0692; F16D 2500/1117; F16D 2300/26; F16H 61/688; F16H 2061/0046;
(Continued)

(56) References Cited

U.S. PATENT DOCUMENTS 7,198,021 B2 * 4/2007 Kawakubo ............. F16H 57/02
123/198 P
8,316,815 B2 * 11/2012 Negoro ............. F01M 11/0004
123/195 C
(Continued)

FOREIGN PATENT DOCUMENTS

DE 10 2012 204 939 A1 10/2012
DE 10 2012 213 785 A1 2/2013
(Continued)

OTHER PUBLICATIONS

German Office Action for German Applicaton No. 102014211592.2, daled Apr. 26. 2021, with English translation.

*Primary Examiner* — Ernesto A Suarez
*Assistant Examiner* — Ryan P Dodd
(74) *Attorney, Agent, or Firm* — Birch, Stewart, Kolasch & Birch, LLP (57) ABSTRACT

An internal combustion engine which can be miniaturized, even where it includes an oil filter between a hydraulic clutch and an oil pump, without significantly increasing the length of an oil passage for the hydraulic clutch, the oil pump and a hydraulic pressure adjustment apparatus. A second oil filter is provided on an oil pan at a lower portion of the internal combustion engine so as to be disposed at a position at which the second oil filter does not overlap with any of a controlling oil pump and a hydraulic pressure adjustment apparatus as viewed in side elevation and which is lower than those of the oil pump and the hydraulic pressure adjustment apparatus.

9 Claims, 6 Drawing Sheets

(51) Int. Cl.
*F02B 61/02* (2006.01)
*F01M 1/02* (2006.01)
*F01M 1/10* (2006.01)
*F01M 1/16* (2006.01)
*F16D 25/0638* (2006.01)
*F16D 21/06* (2006.01)
*B62M 11/04* (2006.01)
*F01M 1/12* (2006.01)

(52) U.S. Cl.
CPC ............ *F01M 2001/1028* (2013.01); *F01M 2001/126* (2013.01); *F16D 2021/0607* (2013.01); *F16D 2021/0661* (2013.01); *F16D 2021/0692* (2013.01); *F16D 2048/0233* (2013.01)

(58) Field of Classification Search
CPC ... F16H 2057/02043; F16H 2057/0203; F16H 57/021; F16H 3/006

See application file for complete search history.

(56) References Cited

U.S. PATENT DOCUMENTS

| | | | | |
|---|---|---|---|---|
| 8,671,906 | B2* | 3/2014 | Fujimoto | F16D 13/58 |
| | | | | 123/197.5 |
| 2005/0107194 | A1* | 5/2005 | Oishi | F01M 11/02 |
| | | | | 474/28 |
| 2007/0044744 | A1* | 3/2007 | Kono | F01L 1/146 |
| | | | | 123/90.16 |
| 2009/0084651 | A1 | 4/2009 | Fujimoto et al. | |
| 2010/0025180 | A1 | 2/2010 | Kanno et al. | |
| 2010/0206253 | A1* | 8/2010 | Fujimoto | F01L 1/143 |
| | | | | 123/90.15 |
| 2010/0243396 | A1* | 9/2010 | Mizuno | F16D 48/04 |
| | | | | 192/48.603 |
| 2011/0220057 | A1* | 9/2011 | Fujimoto | F16D 13/58 |
| | | | | 123/197.5 |
| 2012/0247904 | A1* | 10/2012 | Mitsubori | F01M 1/16 |
| | | | | 192/48.601 |
| 2015/0276049 | A1* | 10/2015 | Sugiura | B62K 11/04 |
| | | | | 180/230 |

FOREIGN PATENT DOCUMENTS

DE    11 2007 002 228 B4    10/2013
JP         2012-214116 A    11/2012

* cited by examiner

INTERNAL COMBUSTION ENGINE

BACKGROUND OF THE INVENTION

1. Field of the Invention

The present invention relates to an internal combustion engine.

2. Description of Background Art

An internal combustion engine is known that includes a hydraulic clutch and an oil pump. See, for example, Japanese Patent Laid-Open No. 2012-214116. In this internal combustion engine, oil can be supplied to the hydraulic clutch through an oil passage formed between the hydraulic clutch and the oil pump. An oil filter is provided in the middle of the oil passage between the hydraulic clutch and the oil pump such that oil to be supplied to the hydraulic clutch is purified by the oil filter.

Such an internal combustion engine including a hydraulic clutch as described above requires, in addition to the above-described oil pump which is a hydraulic pressure generation source, a hydraulic pressure adjustment apparatus (hydraulic pressure adjustment valve or the like) for adjusting the hydraulic pressure of oil. The hydraulic clutch, oil pump and hydraulic adjustment apparatus are desired to be disposed in a concentrated manner in order to achieve a reduction of the oil passage length of the oil passage which extends over them. The internal combustion engine disclosed in Japanese Patent Laid-Open No. 2012-214116, mentioned above, further includes an oil filter provided in the middle of the oil passage between the hydraulic clutch and the oil path. Preferably, such an oil filter as just described is disposed suitably without increasing the length of the oil passage extending over the hydraulic clutch, oil pump and hydraulic pressure adjustment apparatus and also without increasing the size of the internal combustion engine.

However, in the internal combustion engine disclosed in Japanese Patent Laid-Open No. 2012-214116, the oil filter is disposed in a crankcase in which the oil pump and the hydraulic pressure adjustment apparatus are disposed. The oil filter overlaps with the hydraulic pressure adjustment apparatus as viewed in a side elevation and also neighbors with the oil pump which is disposed closely to a lower end of the crankcase which is located proximately to an oil pan. Therefore, the oil filter is positioned rather near to the outer side in a widthwise direction of the crankcase (crankshaft axial line direction).

Therefore, in the internal combustion engine disclosed in Japanese Patent Laid-Open No. 2012-214116, the crankcase has a large dimension in the widthwise direction, and the internal combustion engine is large in size as a whole. In addition, arising from the fact that the oil filter is positioned rather near to the outer side, also the oil passage extending over the hydraulic clutch, oil pump and hydraulic pressure adjustment apparatus has a long length. Therefore, it is not necessarily considered that the oil filter is disposed favorably.

SUMMARY AND OBJECTS OF THE INVENTION

Therefore, it is an object of an embodiment of the present invention to provide an internal combustion engine which can be miniaturized, even where it includes an oil filter between a hydraulic clutch and an oil pump, without significantly increasing the length of an oil passage for the hydraulic clutch, the oil pump and a hydraulic pressure adjustment apparatus.

According to an embodiment of the present invention, an internal combustion chamber includes:

a hydraulic clutch (61, 62) which operates with oil fed under pressure from an oil pump (105) to change over transmission of a driving force of a crankshaft (25) to a speed change shaft (47, 48) between engagement and disengagement;

a hydraulic pressure adjustment apparatus (75) configured to adjust the hydraulic pressure of the oil fed under pressure from the oil pump (105) and to be supplied to the clutch (61, 62) in response to a timing of engagement or disengagement of the clutch (61, 62);

the oil being supplied from the oil pump (105) to the clutch (61, 62) through the hydraulic pressure adjustment apparatus (75); and an oil filter (71) is configured to purify the oil to be fed under pressure from the oil pump (105) to the hydraulic pressure adjustment apparatus (75);

the oil filter (71) being provided on an oil pan (30) at a lower portion of the internal combustion engine so as to be disposed at a position at which the oil filter (71) does not overlap with any of the oil pump (105) and the hydraulic pressure adjustment apparatus (75) as viewed in side elevation and which is lower than those of the oil pump (105) and the hydraulic pressure adjustment apparatus (75).

According to an embodiment of the present invention, the internal combustion engine is configured such that the clutch (61, 62) is disposed just above the oil pump (105), the hydraulic pressure adjustment apparatus (75) and the oil filter (71) within a range within which the clutch (61, 62) overlaps with the oil pump (105), the hydraulic pressure adjustment apparatus (75) and the oil filter (71) in a forward and rearward direction as viewed in a side elevation.

According to an embodiment of the present invention, the hydraulic pressure adjustment apparatus (75) includes a pressure regulating valve portion (73a, 74a) and an electromagnetic driving portion (73b, 74b) which drives the pressure regulating valve portion (73a, 74a) to open and close. The electromagnetic driving portion (73b, 74b) is disposed so as to be positioned between a speed change shaft (47, 48) on which the clutch (61, 62) is disposed and the crankshaft (25) in a forward and rearward direction.

According to an embodiment of the present invention, the oil pump (105) and the hydraulic pressure adjustment apparatus (75) are disposed in a juxtaposed relationship with each other in an axial direction of the oil pump (105), and the oil filter (71) is disposed just below the hydraulic pressure adjustment apparatus (75).

According to an embodiment of the present invention, the oil filter (71) is disposed at a rear portion of the oil pan (30) as viewed in a side elevation.

According to an embodiment of the present invention, the internal combustion engine is configured such that it further includes a hydraulic pressure sensor (120) which detects a hydraulic pressure of the oil to be supplied to the oil filter (71) and is inserted in and fixed to the oil pan (30) and extends through an outer wall of the oil pan (30).

According to an embodiment of the present invention, the internal combustion engine is configured such that the hydraulic pressure sensor (120) is inserted in and fixed to the oil pan (30) and extends through a rear wall of the oil pan (30).

According to an embodiment of the present invention, the internal combustion engine is configured such that it further includes:

a suction passage (109) through which the oil in the oil pan (30) is sucked into the oil pump (105);

a discharge passage (111) through which the oil is discharged from the oil pump (105) to the oil filter (71); and a supply passage (113) through which the oil is discharged from the oil filter (71) toward the hydraulic pressure adjustment apparatus (75);

the suction passage (109), the discharge passage (111) and the supply passage (113) being disposed in parallel to each other so as to extend upwardly and downwardly.

According to an embodiment of the present invention, even where the internal combustion engine includes the oil filter in addition to the hydraulic clutch and the hydraulic pressure adjustment apparatus for the hydraulic clutch, the oil filter is provided on the oil pan at the lower position at which the oil filter does not overlap with any of the oil pump and the hydraulic pressure adjustment apparatus. Therefore, the oil filter can be disposed in a neighboring relationship with the oil pump and the hydraulic pressure adjustment apparatus so as not to overlap with each other at a sideward position within a range within which the oil passage length does not increase significantly between them. Therefore, miniaturization of the internal combustion engine can be anticipated without increasing the size of the internal combustion engine in the widthwise direction (in the transverse direction).

According to an embodiment of the present invention, the clutch is disposed just above the oil pump, the hydraulic pressure adjustment apparatus and the oil filter within the range within which the clutch overlaps with the oil pump, the hydraulic pressure adjustment apparatus and the oil filter in the forward and rearward direction. Therefore, the oil passage from the oil pump to the clutch can be reduced in length to the utmost, and miniaturization can be anticipated.

According to an embodiment of the present invention, the electromagnetic driving portion which is likely to occupy a large space in comparison with the pressure regulating valve portion can be positioned between the crankshaft and the speed change shaft between which a space can be assured readily in the widthwise direction of the internal combustion engine. Therefore, an increase in size of the internal combustion engine in the widthwise dimension can be suppressed.

According to an embodiment of the present invention, since the oil filter is disposed just below the hydraulic pressure adjustment apparatus, it is disposed in a displaced relationship from just below the oil pump. Therefore, the oil filter can be disposed in the space just below the hydraulic pressure adjustment apparatus while the oil filter does not make an obstacle to the suction passage of the oil pump and the length of the suction passage of the oil pump is suppressed to be short.

According to an embodiment of the present invention, while, in an internal combustion engine, a strainer or an oil passage is disposed centrally or in front of an oil pan, since the oil filter is disposed at a rear portion of the oil pan, the oil filter can be disposed on the oil pan within a range within which the influence thereof on conventionally existing pars is low. Further, the free space of the oil pan can be utilized to suppress increase in size of the oil pan.

According to an embodiment of the present invention, where a hydraulic pressure sensor is provided for the oil filter disposed at a rear portion of the oil pan, it is inserted in and fixed to the oil pan and extends through the outer wall of the oil pan. Consequently, the hydraulic pressure sensor is fixed from the outside. Therefore, since a wiring line and so forth can be laid out on the outer side of the oil pan, an increase in the size of the oil pan can be prevented. Further, since the hydraulic pressure sensor can be operated from the outside, maintenance of the hydraulic pressure sensor can be carried out favorably.

According to an embodiment of the present invention, the hydraulic pressure sensor is inserted in and fixed to the oil pan and extends through the rear wall of the oil pan. Consequently, since the hydraulic pressure sensor does not project in a widthwise direction from the internal combustion engine, the hydraulic pressure sensor can be protected by the oil pan.

According to an embodiment of the present invention, since the suction passage, discharge passage and supply passage are disposed in a neighboring relationship with each other, the area occupied by the passages can be reduced. In addition, since the directions of the passages coincide with each other, the formation of the passages can be readily carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment of the present invention is described with reference to the drawings. It is to be noted that, unless otherwise specified, such directions as forward, rearward, leftward and rightward directions in the following description are the same as the directions with respect to a vehicle described below. Further, at suitable locations in the figures referred to in the following description, an arrow mark FR indicates the vehicle forward direction, arrow mark LH indicates the vehicle leftward direction, arrow mark RH indicates the vehicle rightward direction and a further arrow mark UP indicates the vehicle upward direction.

Figure 1:
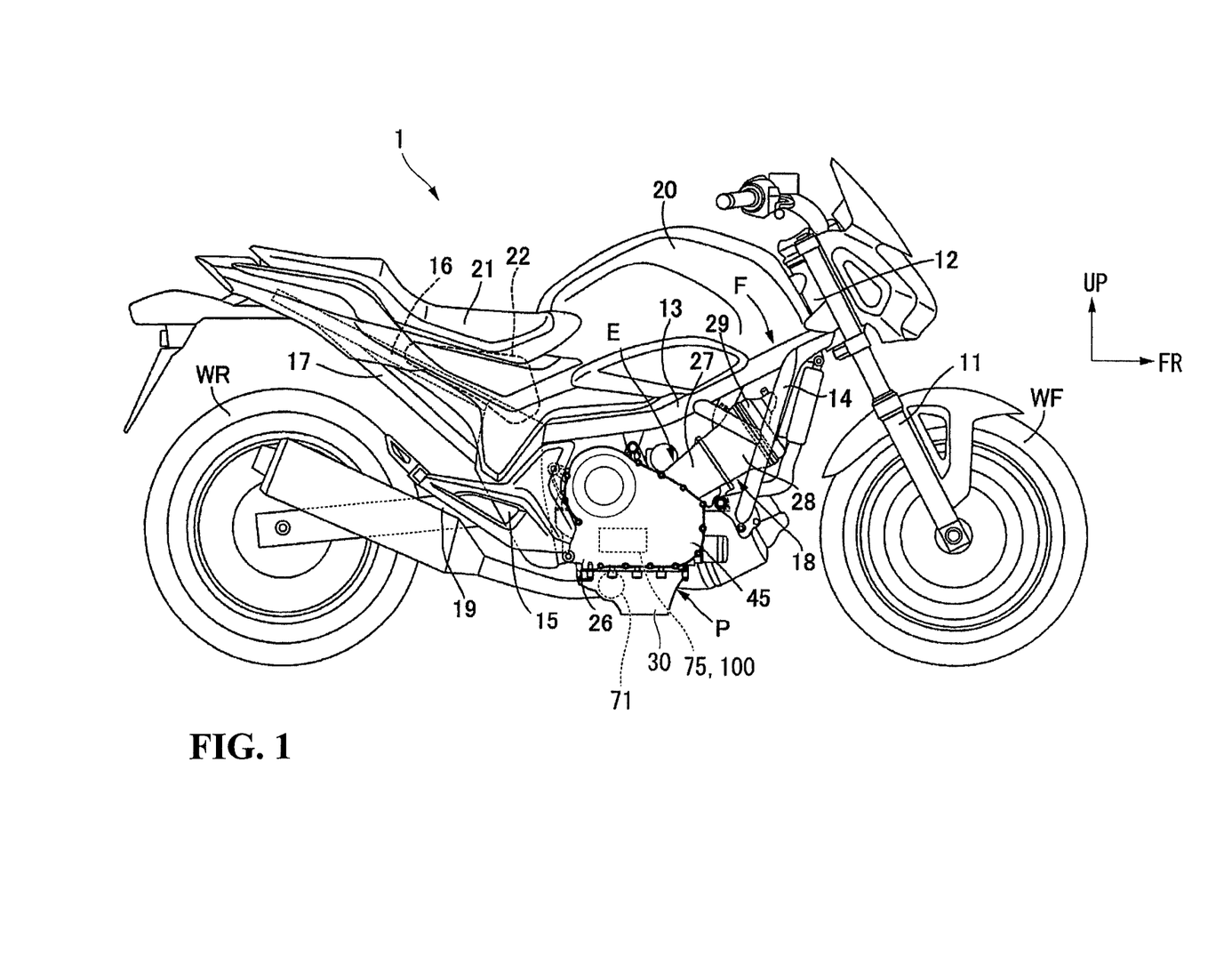
FIG. 1 is a right side elevational view of a motorcycle including an internal combustion engine according to an embodiment of the present invention.

FIG. 1 depicts a motorcycle 1 including an internal combustion engine E according to the present embodiment.

First, in the motorcycle 1, a vehicle body frame F includes a head pipe 12, a pair of left and right main frames 13, a pair of left and right down frames 14, a pair of left and right center frames 15, a pair of left and right seat rails 16, and a rear frame 17. The head pipe 12 supports a front fork 11 for steering movement thereon, and the front fork 11 in turn supports a front wheel WF for rotation thereon. The main frames 13 extend rearwardly and downwardly from the head pipe 12. The down frames 14 extend downwardly from a front end portion of the main frames 13. The center frames 15 extend downwardly from a rear end portion of the main frames 13. The seat rails 16 extend rearwardly and upwardly from an upper portion of the center frames 15. The rear frame 17 interconnects an intermediate portion of the center frames 15 and a rear portion of the seat rails 16.

In a region defined by the main frames 13, down frames 14 and center frames 15, a power unit P is disposed in such a manner as to be supported by the vehicle body frame F. The power unit P includes a multi-cylinder (for example, two-cylinder) internal combustion engine E and a transmission M (refer to FIG. 3) partly built in an engine main body 18 of the internal combustion engine E. A rear wheel WR is supported for rotation at a rear end portion of a swing arm 19 and driven by power generated by the power unit P. The swing arm 19 is supported at a front end portion thereof for upward and downward rocking motion on the center frames 15. An accommodation box 20 is supported on the main frames 13 and disposed above the internal combustion engine E. A rider's seat 21 of the tandem type is supported on the seat rails 16 and disposed behind the accommodation box 20. A fuel tank 22 is disposed below the rider's seat 21.

Figure 2:
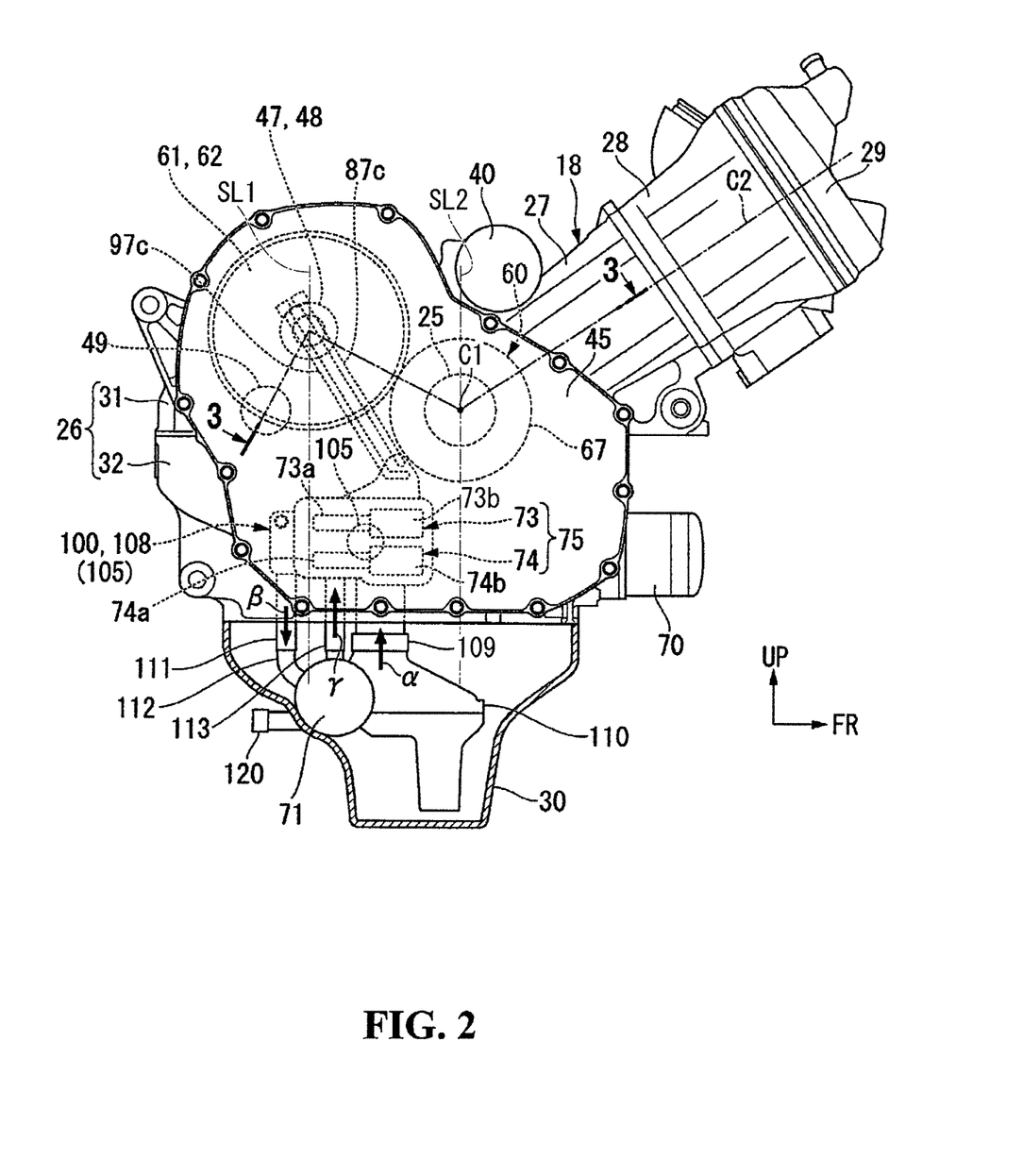
FIG. 2 is a right side elevational view of the internal combustion engine.

Referring to FIG. 2, the engine main body 18 includes a crankcase 26, a cylinder main body 27, and a cylinder head 28. The crankcase 26 supports a crankshaft 25 for rotation thereon. The crankshaft 25 has a crankshaft axial line (rotational center axial line) C1 extending along a vehicle widthwise direction (namely, in the leftward and rightward direction, broadly in a transverse direction, more broadly, in a horizontal direction). The cylinder main body 27 has a cylinder axial line C2 inclined forwardly and stands uprightly at an upper end of a front portion of the crankcase 26. The cylinder head 28 is coupled to an upper end of the cylinder main body 27. A head cover 29 is coupled to an upper end of the cylinder head 28. An oil pan 30 is coupled to a lower end of the crankcase 26. The crankcase 26 is configured from two divisional parts including an upper case half 31 and a lower case half 32 across a horizontal plane as a parting plane. The cylinder main body 27 is formed integrally with the upper case half 31.

It is to be noted that, in FIG. 2, the oil pan 30 is depicted in a vertical section for the convenience of illustration.

Figure 3:
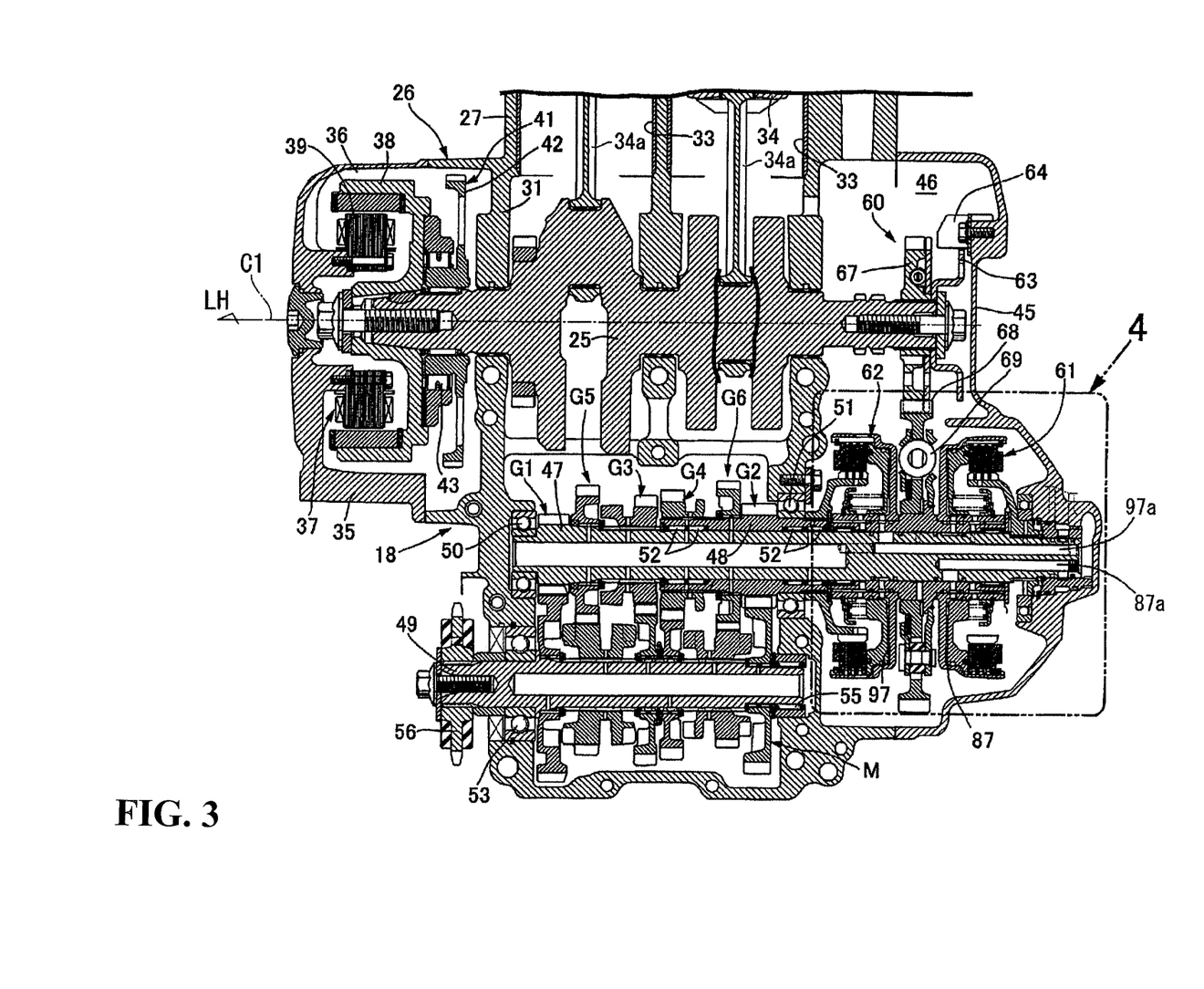
FIG. 3 is a sectional view taken along line 3-3 of FIG. 2.

Referring also to FIG. 3, the cylinder main body 27 has, in the present embodiment, a pair of left and right cylinder bores 33 disposed in parallel in the vehicle widthwise direction. A piston 34 is fitted for sliding movement in each of the cylinder bores 33. Each piston 34 is connected to the crankshaft 25 through a connecting rod 34a.

A generator cover 35 is coupled to a left side face of the crankcase 26 (engine main body 18) and cooperates with the crankcase 26 to form a generator chamber 36 therebetween. A generator 37 is accommodated in the generator chamber 36 and has a rotor 38 fixed to a left end portion of the crankshaft 25 which extends into the inside of the generator chamber 36. A stator 39 of the generator 37 is fixed to the generator cover 35 in such a manner as to be surrounded by the rotor 38. A starter motor 40 is fixed to an upper portion of the crankcase 26 (refer to FIG. 2). A driven gear 42 of a speed reduction gear train 41 is connected to the rotor 38 through a one-way clutch 43 and transmits driving force of the starter motor 40.

A clutch cover 45 is coupled to a right side face of the crankcase 26 (engine main body 18) and cooperates with the crankcase 26 to form a clutch chamber 46 therebetween. The transmission M is accommodated in the crankcase 26. The transmission M includes a plurality of stages of gear trains (for example, first to sixth speed gear trains G1 to G6) which are selectively established between first and second main shafts 47 and 48 and a countershaft 49. The first and second main shafts 47 and 48 and the countershaft 49 are supported for rotation by the crankcase 26 such that they have rotational center axial lines parallel to the crankshaft axial line C1. The first speed gear train G1, third speed gear train G3 and fifth speed gear train G5 are provided between the first main shaft 47 and the countershaft 49 while the second speed gear train G2, fourth speed gear train G4 and sixth speed gear train G6 are provided between the second main shaft 48 and the countershaft 49.

From between the first and second main shafts 47 and 48, the second main shaft 48 has a length over which only an intermediate portion of the first main shaft 47 extends and is fitted coaxially and for relative rotation with an outer periphery of the first main shaft 47. The intermediate portion of the first main shaft 47 and a right end portion of the second main shaft 48 extend through a right side wall of the crankcase 26. The first and second main shafts 47 and 48 are supported for rotation on the right side wall of the crankcase 26 through a ball bearing 51. The first main shaft 47 is supported at a left end portion thereof for rotation on a left side wall of the crankcase 26 through a ball bearing 50. A plurality of needle bearings 52 are interposed between the first and second main shafts 47 and 48.

The countershaft 49 is supported at a left end portion thereof for rotation on the left side wall of the crankcase 26 through a ball bearing 53. The countershaft 49 is supported at a right end portion thereof for rotation on the right side wall of the crankcase 26 through a needle bearing 55.

A driving sprocket wheel 56 is supported for integral rotation at a left end portion of the countershaft 49 projecting from the left side wall of the crankcase 26. The driving sprocket wheel 56 cooperates with a driven sprocket wheel supported for integral rotation on the rear wheel WR and an endless chain to configure a chain type power train as a secondary reduction gear.

The power transmission system for transmitting rotational power from the internal combustion engine E to the rear wheel WR includes a primary speed reducer 60, a first hydraulic clutch 61, a second hydraulic clutch 62, the transmission M and the above-described chain type power train. The primary speed reducer 60 transmits power from the crankshaft 25. The first hydraulic clutch 61 is interposed between the primary speed reducer 60 and the first main shaft 47 while the second hydraulic clutch 62 is interposed between the primary speed reducer 60 and the second main shaft 48. The primary speed reducer 60, first hydraulic clutch 61 and second hydraulic clutch 62 are accommodated in the clutch chamber 46. A pulser 63 is supported for integral rotation at a right end portion of the crankshaft 25 in the clutch chamber 46. A rotational speed sensor 64 is fixedly supported on the clutch cover 45 in an opposing relationship to an outer periphery of the pulser 63.

Figure 4:
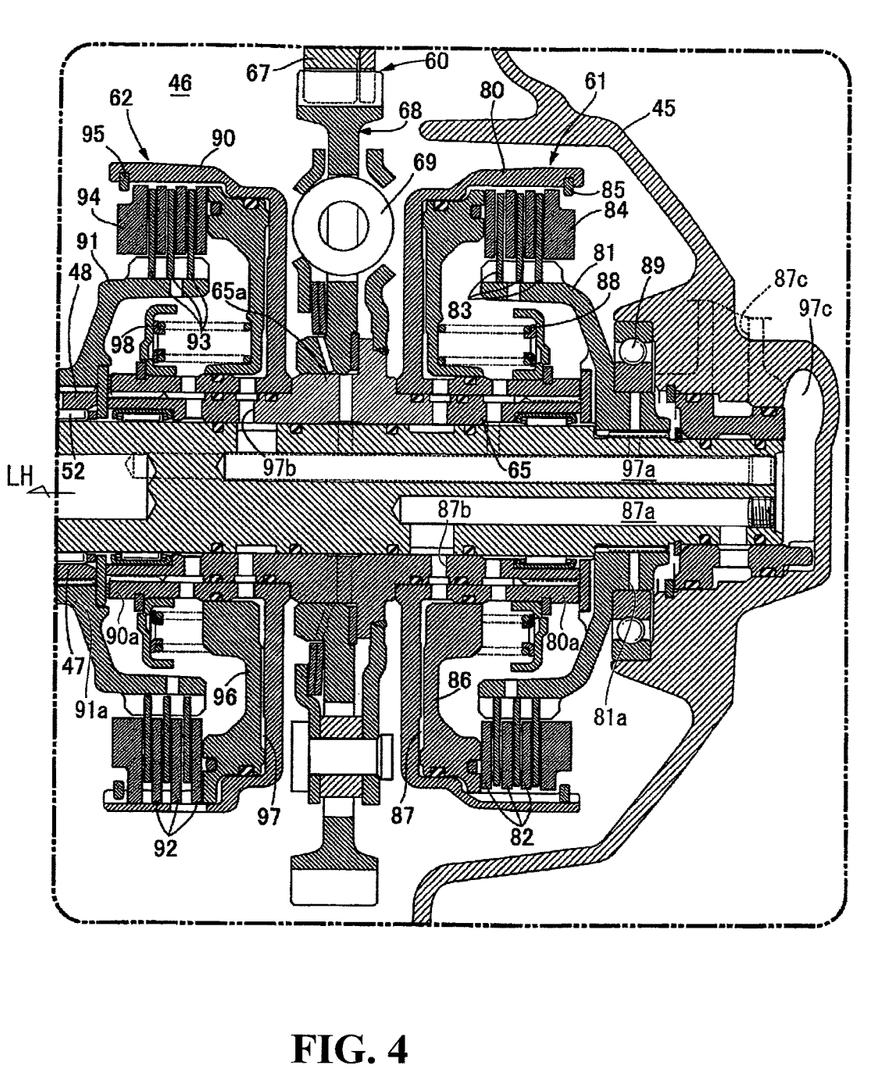
FIG. 4 is an enlarged view of a portion indicated by an arrow mark 4 of FIG. 3.

Referring to FIG. 4, a cylindrical transmission cylinder shaft 65 is fitted for relative rotation on an outer periphery of a right side portion of the first main shaft 47 in a neighboring relationship with a right portion of the second main shaft 48. A large diameter portion 65*a* is formed on an outer periphery of an intermediate portion of the transmission cylinder shaft 65, and a primary driven gear 68 of the primary speed reducer 60 is supported for integral rotation on an outer periphery of the large diameter portion 65*a*. In FIG. 4, a primary driving gear 67 is mounted for integral rotation with the crankshaft 25 in the primary speed reducer 60, and the primary driven gear 68 has a damper spring 69.

A primary clutch outer 80 of the first hydraulic clutch 61 is fitted at a hub portion 80*a* thereof against relative rotation with an outer periphery of a right side portion of the transmission cylinder shaft 65 in a rightwardly neighboring relationship with the large diameter portion 65*a*. A second clutch outer 90 of the second hydraulic clutch 62 is fitted against relative rotation with an outer periphery of a left end portion of the transmission cylinder shaft 65 in a leftwardly neighboring relationship with the large diameter portion 65*a*.

The primary clutch outer 80 has a bottomed cylindrical shape open rightwardly while the second clutch outer 90 has a bottomed cylindrical shape open leftwardly. The primary clutch outer 80 and the second clutch outer 90 oppose at bottom walls thereof to each other in an axial direction with the primary driven gear 68 interposed therebetween. The first hydraulic clutch 61 engages and disengages the power transmission between the transmission cylinder shaft 65 and the first main shaft 47, and the second hydraulic clutch 62 engages and disengages the power transmission between the transmission cylinder shaft 65 and the second main shaft 48.

A first clutch inner 81 of the first hydraulic clutch 61 is fitted at a hub portion 81*a* thereof against relative rotation on an outer periphery of a right end portion of the first main shaft 47. The first clutch inner 81 has a bowl shape open leftwardly and is disposed in the inside of the primary clutch outer 80. Inner clutch plates 83 are supported for integral rotation on an outer periphery of the first clutch inner 81 while outer clutch plates 82 are supported for integration rotation on an inner periphery of the primary clutch outer 80. The inner clutch plates 83 and the outer clutch plates 82 overlap alternately with each other. A first clutch piston 86 is disposed on the inner side of the clutch outer 80 in a neighboring relationship with the bottom wall of the primary clutch outer 80. A first hydraulic chamber 87 is formed between the bottom wall of the primary clutch outer 80 and the first clutch piston 86. An annular pressure receiving plate 84 is disposed on the right side of the laminated body of the inner and outer clutch plates 82 and 83.

A snap ring 85 is fitted on an inner periphery of the primary clutch outer 80 such that it is contacted from the left by the pressure receiving plate 84 to restrict rightward movement of the pressure receiving plate 84. If pressurized oil is supplied into the first hydraulic chamber 87 to move the first clutch piston 86 rightwardly, then the inner and outer clutch plates 82 and 83 are pressed together between the first clutch piston 86 and the pressure receiving plate 84. Consequently, driving force of the crankshaft 25 is transmitted to the first main shaft 47 through the primary speed reducer 60 and the first hydraulic clutch 61. If the supply of the pressurized oil is stopped, then the power transmission between the crankshaft 25 and the first main shaft 47 is canceled. In FIG. 4, a return spring 88 is provided for biasing the first clutch piston 86 leftwardly. The first main shaft 47 is supported at a right end portion thereof for rotation on the clutch cover 45 through the hub portion 80*a* of the first clutch inner 81 and a ball bearing 89 fitted on an outer periphery of the hub portion 80*a*.

A second clutch inner 91 of the second hydraulic clutch 62 is fitted at a hub portion 91*a* thereof against relative rotation on an outer periphery of a right end portion of the second main shaft 48. The second clutch inner 91 has a bowl shape open rightwardly and is disposed on the inner side of the second clutch outer 90. Inner clutch plates 93 are supported for integral rotation on an outer periphery of the second clutch inner 91 while outer clutch plates 92 are supported for integral rotation on an inner periphery of the second clutch outer 90. The inner clutch plates 93 and the outer clutch plates 92 overlap alternately with each other. A second clutch piston 96 is disposed on the inner side of the second clutch outer 90 in a neighboring relationship with a bottom wall of the second clutch outer 90. A second hydraulic chamber 97 is formed between the bottom wall of the second clutch outer 90 and the second clutch piston 96. An annular pressure receiving plate 94 is disposed on the left side of the laminated body of the inner and outer clutch plates 92 and 93.

A snap ring 95 is fitted on an inner periphery of the second clutch outer 90 and is contacted from the right side by the pressure receiving plate 94 to restrict leftward movement of the pressure receiving plate 94. If pressurized oil is supplied into the second hydraulic chamber 97 to move the second clutch piston 96 leftwardly, then the inner and outer clutch plates 92 and 93 are pressed together between the second clutch piston 96 and the pressure receiving plate 94. Consequently, a driving force of the crankshaft 25 is transmitted to the second main shaft 48 through the primary speed reducer 60 and the second hydraulic clutch 62. If the supply of the pressurized oil is canceled, then the power transmission between the crankshaft 25 and the second main shaft 48 stops. In FIG. 4, a return spring 98 is provided for biasing the second clutch piston 96 rightwardly.

A first oil passage 87*a* and a second oil passage 97*a* are formed in a right side portion of the first main shaft 47. The first oil passage 87*a* extends in an axial direction from the right end of the first main shaft 47 to a same position as that of the first hydraulic chamber 87. The second oil passage 97*a* extends in an axial direction from the right end of the first main shaft 47 to a same position as that of the second hydraulic chamber 97.so A first end oil passage 87*b* extends in a diametrical direction from a left end portion of the first oil passage 87*a* to the first hydraulic chamber 87. Meanwhile, a second end oil passage 97*b* extends in a diametrical direction from a left end portion of the second oil passage 97*a* to the second hydraulic chamber 97.

Although the first oil passage 87*a* is closed at the left end thereof, a first oil feed passage 87*c* is connected at a base end portion thereof to a right end portion of the first oil passage 87*a*. The first oil feed passage 87*c* is formed in the clutch cover 45 in such a manner as to extend in a diametrical direction. The second oil passage 97*a* is open at a right end portion thereof to a base end portion of a second feed oil passage 97*c*. The second feed oil passage 97*c* is formed in parallel to the first oil feed passage 87*c* in the clutch cover 45.

Referring to FIG. 2, in the present embodiment, a first oil filter 70 is provided at a front portion of the crankcase 26 in such a manner so as to project forwardly. A second oil filter 71 is provided at an inner wall portion of a rear portion of the oil pan 30. An oil pump unit 100 and a hydraulic pressure adjustment apparatus 75 are provided in the inside of the crankcase 26. The hydraulic pressure adjustment apparatus 75 has first and second solenoid valves 73 and 74 which are valve units for opening and closing the first and second feed oil passage 87c and 97c, respectively.

The oil pump unit 100 supplies (feeds under pressure) oil in order to operate the first hydraulic clutch 61 and the second hydraulic clutch 62 to engage and disengage through the hydraulic pressure adjustment apparatus 75. The oil pump unit 100 further supplies oil for the lubrication into the inside of the cylinder main body 27 and so forth.

The first oil filter 70 is provided in order to purify oil to be fed under pressure from the oil pump unit 100 into the cylinder main body 27 and so forth. The second oil filter 71 is provided in order to purify oil to be fed under pressure from the oil pump unit 100 to the first hydraulic clutch 61 and the second hydraulic clutch 62.

Figure 5:
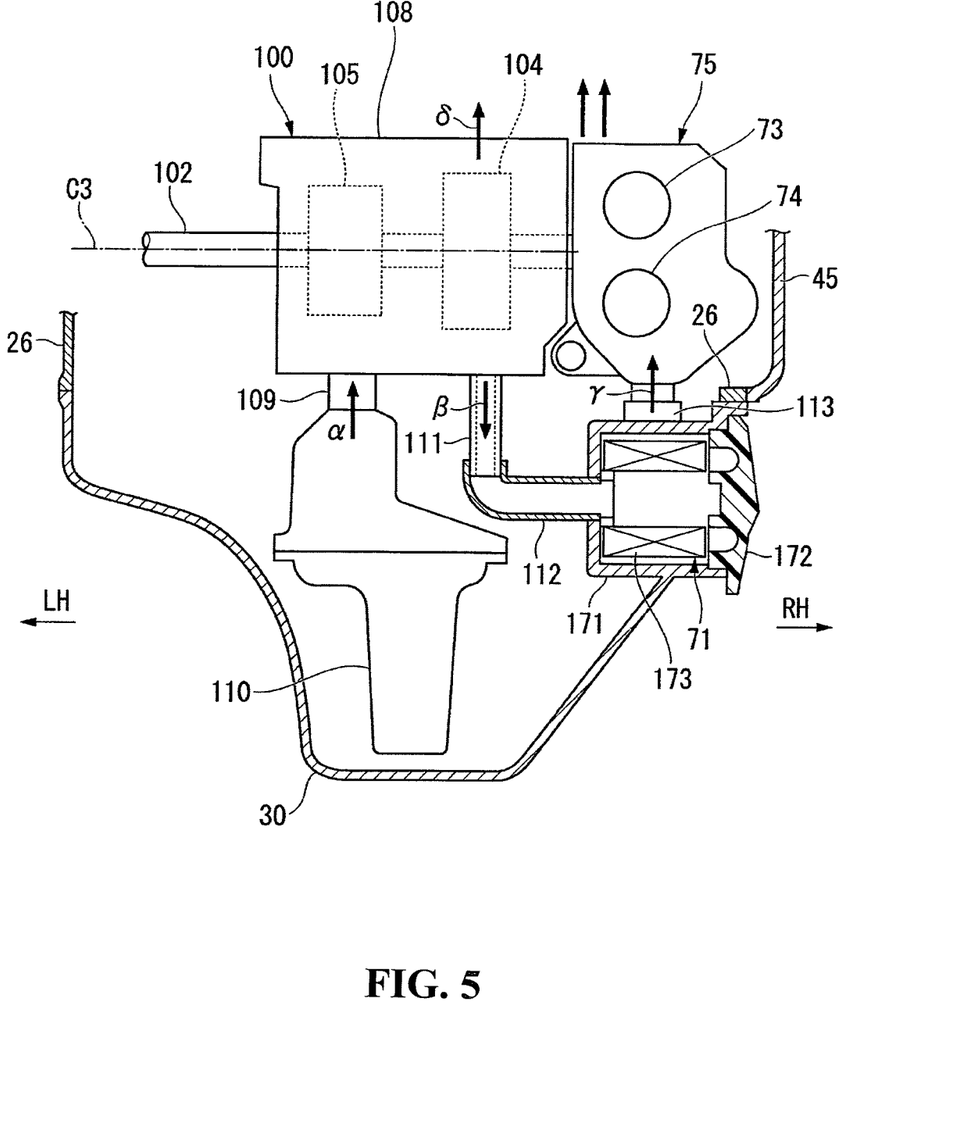
FIG. 5 is a view illustrating a disposition relationship of a pump unit, a hydraulic pressure adjustment apparatus and an oil filter as viewed in rear elevation of the internal combustion engine.
Figure 6:
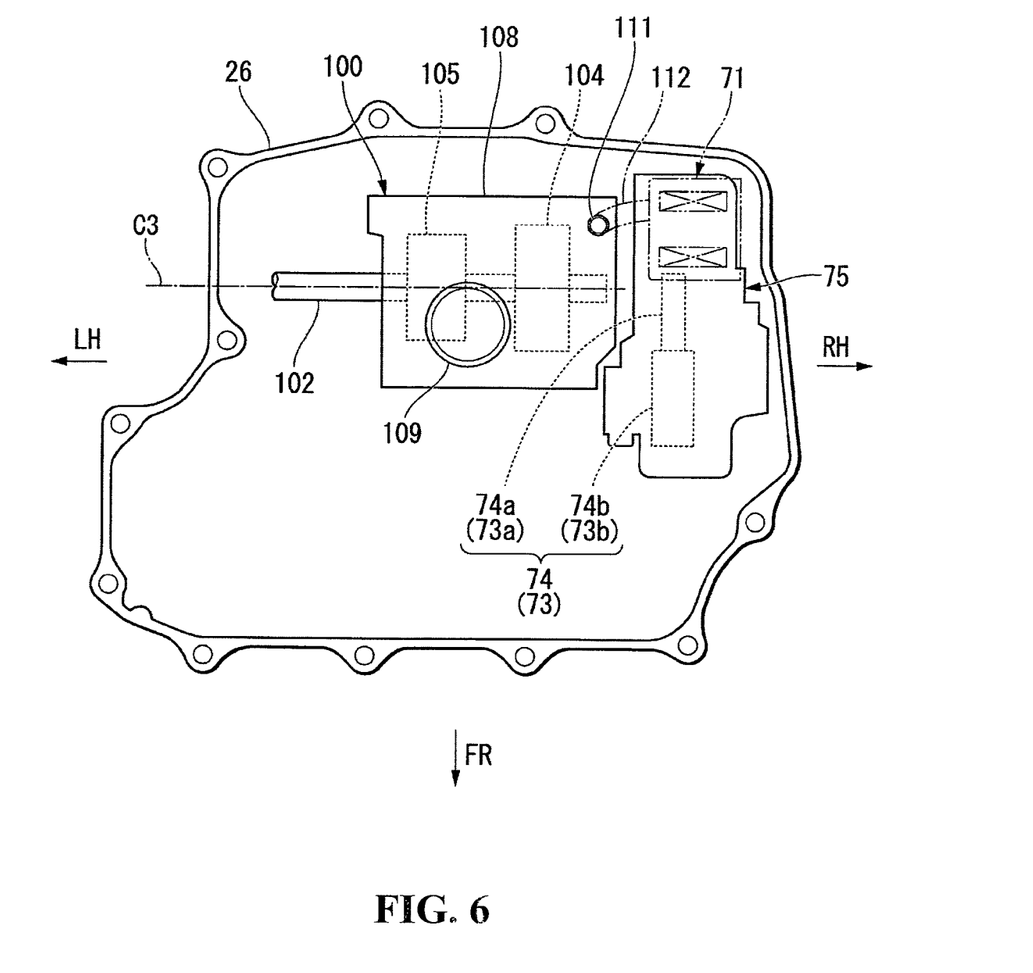
FIG. 6 is a view illustrating a disposition relationship of the pump unit, hydraulic pressure adjustment apparatus and oil filter as viewed in bottom plan of the internal combustion engine.

Referring to FIGS. 5 and 6, the oil pump unit 100 is attached to the inner side of a lower portion of the clutch cover 45. The oil pump unit 100 is driven by rotation of a rotary member which rotates normally when the internal combustion engine E is operative (for example, the crankshaft 25). The oil pump unit 100 has a pump driving shaft (hereinafter referred to simply as driving shaft) 102 extending in parallel to the crankshaft 25. In FIGS. 5 and 6, a rotational center axial line C3 extends in the leftward and rightward direction of the driving shaft 102. As is apparent from FIGS. 5 and 6, the oil pump unit 100 and the hydraulic pressure adjustment apparatus 75 are disposed in a juxtaposed relationship with each other in the leftward and rightward direction, namely, in the direction of the driving shaft 102.

Further, in the present embodiment, the oil pump unit 100 is configured such that a plurality of oil pumps in the form of an internal gear pump of the trochoid tooth type are juxtaposed along the leftward and rightward direction. More particularly, the oil pump unit 100 is configured such that oil pumps, including an engine feed pump 104 and a controlling pump 105, are juxtaposed coaxially with each other and accommodated in a pump body 108. The engine feed pump 104 generates hydraulic pressure for the lubrication of several components (members in the cylinder main body 27 and so forth) of the internal combustion engine E. The controlling pump 105 generates hydraulic pressure for the operation of the first and second hydraulic clutches.

The pump body 108 has a suction pipe portion 109 formed at a lower portion thereof such that it extends toward the oil pan 30 (downwardly), and a strainer 110 is coupled to the suction pipe portion 109. The oil pump unit 100 pumps up oil in the oil pan 30 from the strainer 110 in a direction indicated by an arrow marked α in FIGS. 2 and 5 by driving the engine feed pump 104 and the controlling pump 105. The suction pipe portion 109 functions as a common suction opening to the engine feed pump 104 and the controlling pump 105.

From within oil passing the suction pipe portion 109, oil pumped up by the engine feed pump 104 is discharged from a suitable location of the pump body 108 as indicated by an arrow marked δ in FIG. 5, passes the first oil filter 70 and then flows to the cylinder main body 27 side.

From within the oil passing the suction pipe portion 109, oil pumped up by the controlling pump 105 flows to the second oil filter 71 through a discharge pipe portion 111 and a relay pipe portion 112 as indicated by an arrow marked β. The discharge pipe portion 111 is formed at a lower portion of the pump body 108 and extends downwardly. The relay pipe portion 112 connects the discharge pipe portion 111 and the second oil filter 71 to each other.

Referring to FIG. 5, the second oil filter 71 in the present embodiment is configured from a bottomed cylindrical case main portion 171, a lid member 172, and a cylindrical filter member 173. The case main portion 171 is formed, for example, integrally with the oil pan 30 and is open to the right. The lid member 172 closes up the opening of the case main portion 171. The filter member 173 is accommodated in the case main portion 171. The case main portion 171 may be formed as a separate body from the oil pan 30.

The relay pipe portion 112 described hereinabove is connected to the bottom portion of the case main portion 171. Consequently, oil passing the relay pipe portion 112 flows into an uncleaned chamber formed on the inner periphery of the filter member 173 and spreads to the outer side in a diametrical direction and then passes through and purified by the filter member 173. The purified oil passes a supply pipe portion 113 projecting upwardly from the case main portion 171 and is supplied to the hydraulic pressure adjustment apparatus 75.

Referring to FIGS. 2 and 5, the disposition position of the second oil filter 71 is described. In the present embodiment, the second oil filter 71 is disposed at a position lower than the oil pump unit 100 (controlling pump 105) and the hydraulic pressure adjustment apparatus 75 at which it does not overlap with any of the oil pump unit 100 (controlling pump 105) and the hydraulic pressure adjustment apparatus 75 as viewed in side elevation. The second oil filter 71 is provided on the oil pan 30.

The hydraulic pressure adjustment apparatus 75 is described in detail. In the present embodiment, the first solenoid valve 73 and the second solenoid valve 74 of the hydraulic pressure adjustment apparatus 75 have cylindrical pressure regulating valve portions 73a and 74a and solenoids 73b and 74b, respectively. Each of the pressure regulating valve portions 73a and 74a has a valve housing and a spool valve body accommodated in the valve housing. The solenoids 73b and 74b serve as electromagnetic driving units for driving the spool valve body of the pressure regulating valve portions 73a and 74a in an axial direction to open and close the pressure regulating valve portions 73a and 74a, respectively. The solenoids 73b and 74b are formed with a diameter greater than that of the pressure regulating valve portions 73a and 74a. It is to be noted that, in an electromagnetic valve of this type, generally the solenoid which is a driving portion is greater than a valve main body portion. The first solenoid valve 73 and the second solenoid valve 74 are disposed such that the axial direction thereof extends in the forward and rearward direction.

The flow of oil from the hydraulic pressure adjustment apparatus 75 to the first hydraulic clutch 61 and the second hydraulic clutch 62 is hereinafter described. First, in order to place the first hydraulic clutch 61 into a connection state, the spool valve of the pressure regulating valve portion 73a of the first solenoid valve 73 is driven to place the pressure regulating valve portion 73a into an open state to supply oil to the first hydraulic clutch 61. On the other hand, in order to place the first hydraulic clutch 61 into a disconnection state, the spool valve of the pressure regulating valve portion 73a of the first solenoid valve 73 is driven to place the pressure regulating valve portion 73a into a closed state to stop the supply of oil to the first hydraulic clutch 61.

When the pressure regulating valve portion 73a of the first solenoid valve 73 is placed into an open state, oil passing through the pressure regulating valve portion 73a passes the first oil passage 87a and comes to the first hydraulic clutch 61 to operate the first hydraulic clutch 61.

When the second hydraulic clutch 62 is to be changed over into a connection state or a disconnection state, a procedure similar to that for the first hydraulic clutch 61 is carried out. Therefore, overlapping description of the procedure is omitted. It is to be noted that the oil passing through the pressure regulating valve portion 74a passes the second oil passage 97a and comes to the second hydraulic clutch 62.

In the following, the disposition configuration of the oil pump unit 100, hydraulic pressure adjustment apparatus 75 and second oil filter 71 is described in detail.

Referring to FIG. 2, in the present embodiment, the first hydraulic clutch 61 and the second hydraulic clutch 62 both having a cylindrical shape are disposed, as viewed in a side elevation, within a range within which they overlap with the oil pump unit 100 (controlling pump 105), hydraulic pressure adjustment apparatus 75 and second oil filter 71 in the forward and rearward direction just above the oil pump unit 100 (controlling pump 105), hydraulic pressure adjustment apparatus 75 and second oil filter 71.

More specifically, the first hydraulic clutch 61 and the second hydraulic clutch 62 are disposed above the oil pump unit 100 (controlling pump 105), hydraulic pressure adjustment apparatus 75 and second oil filter 71 as viewed in a side elevation. Further, the members mentioned are disposed in such a relationship that the disposition range of the first hydraulic clutch 61 and the second hydraulic clutch 62 on one coordinate axis extending in the forward and rearward direction and the disposition range of the oil pump unit 100 (controlling pump 105), hydraulic pressure adjustment apparatus 75 and second oil filter 71 on the one coordinate axis extending along the forward and rearward direction have a region in which they overlap with each other on the same coordinate axis.

Further, the pressure regulating valve portions 73a and 74a of the hydraulic pressure adjustment apparatus 75, oil pump unit 100 (controlling pump 105) and second oil filter 71 are disposed within the same width of the first hydraulic clutch 61 and the second hydraulic clutch 62 in the forward and rearward direction. It is to be noted that also the solenoids 73b and 74b may be disposed within the width of the first hydraulic clutch 61 and the second hydraulic clutch 62 in the forward and rearward direction.

Further, the hydraulic pressure adjustment apparatus 75 is disposed such that the solenoids 73b and 74b which serve as electromagnetic driving units are positioned between the first main shaft 47 and second main shaft 48, which are speed change shafts, and the crankshaft 25 in the forward and rearward direction. In other words, where a first straight line SL1 extending downwardly along the vertical direction from the center of the first main shaft 47 and the second main shaft 48 and a second straight line SL2 extending downwardly along the vertical direction from the center of the crankshaft 25 are viewed in a side elevation, the hydraulic pressure adjustment apparatus 75 is disposed such that the solenoids 73b and 74b are positioned within a region between the first straight line SL1 and the second straight line SL2. In the present embodiment, also the pressure regulating valve portions 73a and 74a are disposed in the region between the first straight line SL1 and the second straight line SL2.

Referring to FIG. 5, the second oil filter 71 is disposed just below the hydraulic pressure adjustment apparatus 75 and disposed, in the leftward and rightward direction, at a position spaced from the oil pump unit 100. In other words, the second oil filter 71, hydraulic pressure adjustment apparatus 75 and oil pump unit 100 are disposed in such a relationship that, when the internal combustion engine E is viewed through downwardly from above along the vertical direction (refer to FIG. 6), although the second oil filter 71 and the hydraulic pressure adjustment apparatus 75 overlap with each other, the second oil filter 71 and the oil pump unit 100 do not overlap with each other. Further, the second oil filter 71 is disposed within the width of the hydraulic pressure adjustment apparatus 75 in the forward and rearward direction.

Referring to FIG. 2, a hydraulic pressure sensor 120 is attached to a rear portion of the oil pan 30 and detects the hydraulic pressure of oil to be supplied to the second oil filter 71. In the present embodiment, the hydraulic pressure sensor 120 is inserted in and fixed to the oil pan 30 and extends through an outer wall of a rear portion of the oil pan 30.

The oil passage configuration from the oil pump unit 100 to the hydraulic pressure adjustment apparatus 75 is described in detail. A suction passage through which oil in the oil pan 30 of the oil pump unit 100 is to be sucked is formed from the suction pipe portion 109 described hereinabove. In addition, a discharge oil passage through which oil is to be discharged from the oil pump unit 100 to the second oil filter 71 is formed from the discharge pipe portion 111 and the relay pipe portion 112 described hereinabove. Further, a supply passage along which oil is to be discharged from the second oil filter 71 toward the hydraulic pressure adjustment apparatus 75 is formed from the supply pipe portion 113 described hereinabove.

The suction passage (suction pipe portion 109), discharge passage (discharge pipe portion 111 and relay pipe portion 112) and supply passage (supply pipe portion 113) are disposed substantially in parallel to each other and extend along the upward and downward direction (vertical direction).

More particularly, in the present embodiment, the suction pipe portion 109 which forms the suction passage, the discharge pipe portion 111 from between the pipe portions which configure the discharge passage and the supply pipe portion 113 which forms the supply passage are disposed substantially in parallel to each other and extend along the upward and downward direction.

As described hereinabove, the internal combustion engine E of the present embodiment includes the first hydraulic clutch 61 and the second hydraulic clutch 62 of the hydraulic type, and the hydraulic pressure adjustment apparatus 75. The first hydraulic clutch 61 and the second hydraulic clutch 62 are operated by oil fed under pressure from the controlling pump 105 of the oil pump unit 100 to change over transmission of driving force of the crankshaft 25 to the speed change shaft (first main shaft 47 and second main shaft 48) between on and off. The hydraulic pressure adjustment apparatus 75 adjusts the hydraulic pressure of oil fed under pressure from the controlling pump 105 so as to be supplied to the first hydraulic clutch 61 and the second hydraulic clutch 62 in response to a timing of connection or disconnection of the first hydraulic clutch 61 and the second hydraulic clutch 62.

Further, the internal combustion engine E includes the second oil filter 71 which purifies oil to be fed under pressure from the controlling pump 105 to the hydraulic pressure adjustment apparatus 75. The second oil filter 71 is disposed at a position below the oil pump unit 100 (controlling pump 105) and the hydraulic pressure adjustment apparatus 75 at which it does not overlap with any of the controlling pump 105 and the hydraulic pressure adjustment apparatus 75 as viewed in side elevation. The second oil filter 71 is provided on the oil pan 30 at a lower location of the internal combustion engine E.

Where such a structure as described above is used, also where the internal combustion engine E includes the hydraulic clutch (61, 62) and the hydraulic pressure adjustment apparatus 75 for the clutch and further includes the second oil filter 71 for the clutch and the hydraulic pressure adjustment apparatus 75, since the second oil filter 71 is provided on the oil pan 30 at the lower position at which it does not overlap with any of the controlling pump 105 and the hydraulic pressure adjustment apparatus 75, the second oil filter 71 can be disposed in a neighboring relationship with the controlling pump 105 and the hydraulic pressure adjustment apparatus 75 so as not to overlap with the controlling pump 105 and the hydraulic pressure adjustment apparatus 75 at a sideward position within a range within which the oil passage length does not increase significantly between them. Therefore, miniaturization of the internal combustion engine E can be anticipated without increasing the dimension of the internal combustion engine E in the widthwise direction.

It is to be noted that the present invention is not limited to the embodiment described above but can be altered in various manners without departing from the subject matter of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine, comprising:
   a case;
   a crankshaft in the case, the crankshaft having an axis of rotation extending in a first horizontal direction;
   a speed change shaft for engagement and disengagement with the crankshaft, the speed change shaft having an axis of rotation extending in the first horizontal direction;
   a hydraulic clutch for changing over transmission of a driving force of the crankshaft to the speed change shaft between engagement and disengagement;
   an oil pump for supplying oil under pressure to the hydraulic clutch, the oil pump being below the crankshaft;
   a hydraulic pressure adjustment apparatus configured to adjust the hydraulic pressure of the oil fed under pressure from the oil pump and to be supplied to the hydraulic clutch in response to a timing of engagement or disengagement of the hydraulic clutch, the hydraulic pressure adjustment apparatus having an electromagnetic solenoid, the hydraulic pressure adjustment apparatus being below the crankshaft, spaced from the oil pump in the first horizontal direction and overlapping the oil pump in a second horizontal direction when viewed in the first horizontal direction;
   an oil passage extending between the oil pump and the hydraulic pressure adjustment apparatus;
   a first oil filter provided at a front portion of the case so as to project forwardly, the first oil filter being configured to filter oil to be fed under pressure from the oil pump to a part other than the hydraulic pressure adjustment apparatus; and
   a second oil filter configured to filter the oil to be fed under pressure from the oil pump to the hydraulic pressure adjustment apparatus, the second oil filter being in the oil passage,
   wherein the oil is supplied from the oil pump to the hydraulic clutch through the hydraulic pressure adjustment apparatus,
   wherein a first vertical line extends through the axis of rotation of the crankshaft and a second vertical line extends through the axis of rotation of the speed change shaft,
   wherein at least part of the oil pump and the electromagnetic solenoid of the hydraulic pressure adjustment apparatus are positioned within a region, in the second horizontal direction, between the first vertical line and the second vertical line, the second horizontal direction being orthogonal to the first horizontal direction,
   wherein the oil passage comprises:
      a discharge passage through which the oil is discharged from the oil pump to the second oil filter; and
      a supply passage through which the oil is discharged from the second oil filter toward the hydraulic pressure adjustment apparatus,
   wherein the second oil filter is disposed below the first oil filter, the oil pump and directly below the hydraulic pressure adjustment apparatus,
   wherein the discharge passage includes a conduit having a vertical section disposed between the oil pump and the second oil filter, and
   wherein the supply passage includes a conduit having a vertical section disposed between the second oil filter and the hydraulic pressure adjustment apparatus.

2. The internal combustion engine according to claim 1, wherein the hydraulic clutch is disposed above the oil pump.

3. The internal combustion engine according to claim 2, wherein:
   the hydraulic pressure adjustment apparatus includes a pressure regulating valve portion and the electromagnetic solenoid for driving the pressure regulating valve portion to open and close; and
   the electromagnetic solenoid is disposed so as to be positioned between the first vertical line and the second vertical line.

4. The internal combustion engine according to claim 1, wherein:
   the hydraulic pressure adjustment apparatus includes a pressure regulating valve portion and the electromagnetic solenoid for driving the pressure regulating valve portion to open and close; and
   the electromagnetic solenoid is disposed so as to be positioned between the first vertical line and the second vertical line.

5. The internal combustion engine according to claim 1, further comprising an oil pan attached to a bottom of the case,
   wherein the second oil filter is disposed at a rear portion of the oil pan.

6. The internal combustion engine according to claim 1, further comprising a hydraulic pressure sensor, for detecting a hydraulic pressure of the oil to be supplied to the second oil filter.

7. The internal combustion engine according to claim 6, further comprising an oil pan attached to a bottom of the case,
   wherein the hydraulic pressure sensor is inserted in and fixed to the oil pan and extends through a rear wall of the oil pan.

8. The internal combustion engine according to claim 1, further comprising:

an oil pan attached to a bottom of the case; and a suction passage through which the oil in the oil pan is sucked into the oil pump, wherein the suction passage, the discharge passage and the supply passage are disposed in parallel to each other so as to extend upwardly and downwardly.

9. An internal combustion engine comprising:

a case;

a crankshaft in the case, the crankshaft having an axis of rotation extending in a first horizontal direction;

a speed change shaft for engagement and disengagement with the crankshaft, the speed change shaft having an axis of rotation extending in the first horizontal direction;

a hydraulic clutch for changing over transmission of a driving force of the crankshaft to the speed change shaft between engagement and disengagement;

an oil pump for supplying oil under pressure to the hydraulic clutch, the oil pump being below the crankshaft;

a hydraulic pressure adjustment apparatus configured to adjust the hydraulic pressure of the oil fed under pressure from the oil pump and to be supplied to the hydraulic clutch in response to a timing of engagement or disengagement of the hydraulic clutch, the hydraulic pressure adjustment apparatus having an electromagnetic solenoid, the hydraulic pressure adjustment apparatus being below the crankshaft, spaced from the oil pump in the first horizontal direction and overlapping the oil pump in a second horizontal direction when viewed in the first horizontal direction;

an oil passage extending between the oil pump and the hydraulic pressure adjustment apparatus;

a first oil filter provided at a front portion of the case so as to project forwardly, the first oil filter being configured to filter the oil to be fed under pressure from the oil pump to a part other than the hydraulic pressure adjustment apparatus;

a second oil filter configured to filter the oil to be fed under pressure from the oil pump to the hydraulic pressure adjustment apparatus, the second oil filter being in the oil passage;

an oil pan attached to a bottom of the case; and a suction passage through which the oil in the oil pan is sucked into the oil pump, wherein the oil passage comprises:

a discharge passage through which the oil is discharged from the oil pump to the second oil filter; and a supply passage through which the oil is discharged from the second oil filter toward the hydraulic pressure adjustment apparatus, wherein the oil is supplied from the oil pump to the hydraulic clutch through the hydraulic pressure adjustment apparatus, wherein the second oil filter is provided inside the oil pan and disposed below the first oil filter, the oil pump, and the electromagnetic solenoid, wherein the discharge passage includes a conduit having a vertical section disposed between the oil pump and the second oil filter, and wherein the supply passage includes a conduit having a vertical section disposed between the second oil filter and the hydraulic pressure adjustment apparatus.

* * * * *